United States Patent Office 3,714,336
Patented Jan. 30, 1973

3,714,336
REGENERATION OF ACTIVATED CHARCOAL CATALYST USED IN SULFURYL FLUORIDE PRODUCTION
Ralph A. Davis and Keith A. Allswede, Midland, Mich., assignors to The Dow Chemical Company, Midland, Mich.
No Drawing. Filed Dec. 7, 1970, Ser. No. 95,880
Int. Cl. C01b 17/45; C01j 11/02
U.S. Cl. 423—468                7 Claims

ABSTRACT OF THE DISCLOSURE

Disclosed is a method of regenerating the activated charcoal catalyst used in the production of sulfuryl fluoride by reaction of sulfur dioxide, chlorine and hydrogen fluoride. The method involves reducing the spent catalyst with a hydrogen stream at 400° to 800° C. for at least about 0.5 hour at a space velocity of from 50 to 5,000 cu. ft. of hydrogen per cubic ft. of catalyst per hour.

BACKGROUND OF THE INVENTION

Sulfuryl fluoride, a useful fumigant for tobacco, food and grain, is prepared by the reaction of sulfur dioxide, chlorine and hydrogen fluoride at elevated temperatures over an activated charcoal catalyst. For example U.S. Pat. 3,092,458 discloses that an 87.9% yield of sulfuryl fluoride is obtained by reacting sulfur dioxide, chlorine and hydrogen fluoride over activated charcoal at 255° C. At the outset of an operation using this process, high yields of good quality $SO_2F_2$ are obtained. However, for reasons not well understood, the activated charcoal catalyst becomes poisoned rapidly resulting in the usual disadvantages associated with a poisoned catalyst. U.S. Pat. 3,320,030 discloses that a mixture of activated charcoal and an alkali metal bifluoride effectively catalyzes the reaction and does not poison as quickly as the activated charcoal alone. This catalyst system appears to be effective; however, it suffers from the disadvantages that the material still must be removed from the reactor and replaced with fresh catalyst every 60 to 100 hours of operation. This is a slow process as the reactor has to be cooled and the spent catalyst which contains considerable corrosive HF is difficult to handle and dispose of.

An alternative method of increasing catalyst life is regeneration. The standard method of regenerating an activated charcoal catalyst by partial oxidation with high temperature steam, has the disadvantage of eventually destroying the catalyst both by direct oxidation and degradation of the catalyst particles into fines.

It would be desirable and it is an object of the present invention to provide a new method for the regeneration of the activated charcoal catalyst used in the reaction of $SO_2$, $Cl_2$ and HF to produce $SO_2F_2$.

An additional object is to provide such a method which preserves the catalyst structure and strength while yielding a regenerated catalyst which has improved activity and cycle life.

SUMMARY OF THE INVENTION

The invention is a method for regenerating the activated charcoal catalyst used in the reaction of sulfur dioxide, chlorine and hydrogen fluoride to produce sulfuryl fluoride. The method involves contacting the catalyst with a hydrogen stream at a temperature of from 400° to 800° C. The hydrogen stream is further characterized in that it has a space velocity of from 50 to 5,000 cu. ft. of hydrogen per cu. ft. of catalyst per hour.

DESCRIPTION OF PREFERRED EMBODIMENTS

The regeneration is carried out within the operable temperature range of 400°–800° C. and preferably at a temperature within the range of from 450°–650° C. Regeneration takes place at a space velocity of from 50 to 5000 cu. ft. of $H_2$ per cu. ft. of catalyst per hour. A low rate of $H_2$ feed increases the time necessary for regeneration. Too rapid a feed wastes $H_2$ and increases the problem of bringing the gas to the necessary high temperature. Consequently a space velocity of 800 to 2000 is preferred.

The time required for regeneration will vary inversely with the temperature and space velocity. While some regeneration takes place almost immediately, at least about 0.5 hour is required for substantial regeneration. The maximum regeneration time is not critical, however, 6 hours is usually sufficient. The preferrd regeneration time is as short as possible; in general, a time of from 1.5 to 2 hours is necessary for complete regeneration.

The invention is further illustrated by the following examples.

EXAMPLES I–III

A one gallon nickel mixing vessel was connected to a vertically mounted 2 inch by 42 inch inconel reaction tube heated over about 30 inches of its surface. The reactor was charged with 2300 cc. of Barnaby-Cheney, 6–10 mesh activated coconut charcoal and the wall temperature controlled with a Micromax. An HF flowmeter with a 1/16 inch orifice, and two glass flowmeters, filled with sulfuric acid and equipped with one millimeter orifice, were used to meter HF, $SO_2$ and $Cl_2$ into the mixing vessel. The mixed gases leaving the top of the reactor entered the bottom of a 2.5 inch by 36 inch, partially jacketed, nickel reflux column having a 2 gallon nickel still pot connected to its bottom.

The column was cooled by means of a Dry Ice-methylene chloride bath contained in a 2 inch by 15 inch cold finger in the top of the column. The higher boiling materials, $SO_2$, $SO_2Cl_2$, $SO_2ClF$ and HF, were condensed and collected in the still pot while the lower boiling $SO_2F_2$ and HCl passed through the column into a polyethylene bottle as vacuum break. Next in the series was a water scrubber, followed by a caustic scrubber. The scrubbed gases passed through a wet ice cooled receiver to remove entrained water and then through a flowmeter to measure the flow of sulfuryl fluoride.

After the catalyst's effectiveness had become diminished, as determined by reduced flow of sulfuryl fluoride, the regeneration process was commenced. This was accomplished by passing 50 cubic feet of hydrogen each way from top to bottom as well as from bottom to top of the reactor at a temperature of 600° C. The amount of $H_2$ used represented a volume ratio of $H_2$ to catalyst of 1000/1.

In the manner above described, a 100 hour run was carried out in which catalyst regenerations were made at 21.5, 38.0 and 79.0 hours.

Table I summarizes the observations made during the run.

| Run | Length of run, hrs. | Reactor temp., °C. | Charge, pounds | | | Contact time, sec. | Titration recovery, pounds | | | | | Mole percent conv. to $SO_2F_2$ |
|---|---|---|---|---|---|---|---|---|---|---|---|---|
| | | | HF | $Cl_2$ | $SO_2$ | | HF | HCl | $H_2SO_4$ | $SO_2F_2$ | High boiling cpds. | |
| 1 | [1] 5.5 | 255 | 4.06 | 4.6 | 4.4 | 6.9 | | | | 4.0 | | 60.4 |
| 2 | 32.5 | 255 | 26.4 | 26.4 | 27.1 | 6.75 | 2.05 | 23.4 | .987 | 26.9 | 16.6 | 71.2 |
| 3 | 62.5 | 255 | 44.06 | 50.8 | 53.4 | 7.02 | .96 | 46.43 | 2.97 | 54.3 | 30.6 | 74.0 |
| Total | 100.0 | | | | | | | | | | | |

[1] The short 5.5-hour run was made in order to bring the catalyst to equilibrium before starting the longer periods of operation.

The results set out in Table I demonstrate that the catalyst not only retains its effectiveness, but actually becomes more effective upon regeneration.

We claim:

1. A method for regenerating the activated charcoal catalyst used in the preparation of sulfuryl fluoride by reaction of sulfur dioxide, chlorine and hydrogen fluoride which comprises contacting the catalyst with a hydrogen stream at a temperature of from 400° to 800° C., wherein the hydrogen stream has a space velocity of from 50 to 5,000 cu. ft. of hydrogen per cu. ft. of catalyst per hour.

2. The process of claim 1 wherein the temperature is within the range of from 450° to 650° C. and the catalyst and hydrogen stream are contacted for a time within the range of from 0.5 to 6.0 hours.

3. The process of claim 1 wherein the space velocity is from 800 to 2,000.

4. The process of claim 1 wherein the catalyst and hydrogen are contacted for a period of from 1.5 to 2 hours.

5. The process of claim 2 wherein the space velocity is from 800 to 2,000.

6. The process of claim 2 wherein the catalyst and hydrogen are contacted for a period of from 1.5 to 2 hours.

7. In the process for the preparation of sulfuryl fluoride by reacting sulfur dioxide, chlorine and hydrogen fluoride at an elevated temperature over an activated charcoal catalyst, the improvement which comprises regenerating the catalyst by contacting it with a hydrogen stream at a temperature of from 400° to 800° C., said hydrogen stream having a space velocity of from 50 to 5,000 cu. ft. of hydrogen per cu. ft. of catalyst per hour.

References Cited

UNITED STATES PATENTS

| | | | |
|---|---|---|---|
| 3,320,030 | 5/1967 | Bisignani et al. | 23—203 R |
| 2,772,144 | 11/1956 | Belj | 23—203 R |
| 3,092,458 | 6/1963 | Rich et al. | 23—203 R |
| 3,563,704 | 2/1971 | Torrence | 252—411 R |

FOREIGN PATENTS

| | | | |
|---|---|---|---|
| 1,045,610 | 10/1966 | Great Britain | 252—411 |

HERBERT T. CARTER, Primary Examiner

U.S. Cl. X.R.

252—411; 423—481